United States Patent
Cen et al.

(10) Patent No.: US 11,235,985 B2
(45) Date of Patent: Feb. 1, 2022

(54) METHOD FOR OBTAINING DISTILLATE FROM NON-POTABLE WATER AS WELL AS A DEVICE FOR OBTAINING DISTILLATE FROM NON-POTABLE WATER

(71) Applicant: DESOLENATOR B.V., EB Maastricht (NL)

(72) Inventors: Jiajun Cen, Zwolle (NL); Wilhelmus Franciscus Johannes Janssen, Maastricht (NL); Leon Awerbuch, Winchester, MA (US)

(73) Assignee: DESOLENATOR B.V., Maastricht (NL)

( * ) Notice: Subject to any disclaimer, the term of this patent is extended or adjusted under 35 U.S.C. 154(b) by 0 days.

(21) Appl. No.: 16/960,689

(22) PCT Filed: Feb. 5, 2019

(86) PCT No.: PCT/EP2019/052790
§ 371 (c)(1),
(2) Date: Jul. 8, 2020

(87) PCT Pub. No.: WO2019/154813
PCT Pub. Date: Aug. 15, 2019

(65) Prior Publication Data
US 2020/0385287 A1    Dec. 10, 2020

(30) Foreign Application Priority Data

Feb. 8, 2018 (NL) .................................. 2020402

(51) Int. Cl.
*C02F 1/14* (2006.01)
*H02S 40/38* (2014.01)
(Continued)

(52) U.S. Cl.
CPC .............. *C02F 1/14* (2013.01); *B01D 1/0035* (2013.01); *B01D 1/0082* (2013.01); *B01D 1/28* (2013.01);
(Continued)

(58) Field of Classification Search
CPC .. C02F 1/008; C02F 1/041; C02F 1/06; C02F 1/14; C02F 2103/08; C02F 2201/009;
(Continued)

(56) References Cited

U.S. PATENT DOCUMENTS 9,278,315 B2 *   3/2016   Davis ........................ C02F 1/14
9,834,454 B2 *  12/2017   Frolov ................... B01D 3/343
(Continued)

FOREIGN PATENT DOCUMENTS

CN     203999020 U    12/2014
EP       2784027 A1   10/2014
(Continued)

OTHER PUBLICATIONS

PCT International Search Report completed by the ISA/EP on May 20, 2019 and issued in connection with PCT/EP2019/052790.
(Continued)

*Primary Examiner* — Jonathan Miller
(74) *Attorney, Agent, or Firm* — Barnes & Thornburg LLP

(57) ABSTRACT

The present disclosure relates to a method and device for obtaining distillate from non-potable water. The method comprises the steps of utilizing solar power from a solar power system to produce electricity and steam, utilizing the electricity and the steam in a water treatment device to convert the non-potable water into distillate and concentrate, transporting at least a part of the distillate to consumers for use. The method and device provide multiple effect distil- (Continued)

lation (MED) combined with vapour compression (VC) being able to work 24 hours a day only on solar energy.

19 Claims, 1 Drawing Sheet

(51) Int. Cl.
| | |
|---|---|
| H02S 40/44 | (2014.01) |
| B01D 1/00 | (2006.01) |
| B01D 1/28 | (2006.01) |
| B01D 3/06 | (2006.01) |
| B01D 3/14 | (2006.01) |
| C02F 1/00 | (2006.01) |
| C02F 1/04 | (2006.01) |
| C02F 1/06 | (2006.01) |
| C02F 103/08 | (2006.01) |

(52) U.S. Cl.
CPC .............. *B01D 3/06* (2013.01); *B01D 3/146* (2013.01); *C02F 1/008* (2013.01); *C02F 1/041* (2013.01); *C02F 1/06* (2013.01); *H02S 40/38* (2014.12); *H02S 40/44* (2014.12); *C02F 2103/08* (2013.01); *C02F 2201/009* (2013.01)

(58) Field of Classification Search
CPC ...... B01D 1/0035; B01D 1/0082; B01D 1/28; B01D 3/06; B01D 3/146; H02S 40/38; H02S 40/44
See application file for complete search history.

(56) References Cited

U.S. PATENT DOCUMENTS

| | | | |
|---|---|---|---|
| 9,834,455 B2* | 12/2017 | Frolov | B01D 3/343 |
| 10,207,935 B2* | 2/2019 | Beitelmal | C02F 1/14 |
| 10,358,359 B2* | 7/2019 | Gershon | C02F 1/441 |
| 10,829,913 B1* | 11/2020 | Ahmed | B01D 1/30 |
| 2008/0164135 A1* | 7/2008 | Slook | C02F 1/048 |
| | | | 202/83 |
| 2010/0314238 A1 | 12/2010 | Frolov et al. | |
| 2011/0011802 A1* | 1/2011 | Maydan | C02F 1/02 |
| | | | 210/652 |
| 2011/0198208 A1* | 8/2011 | Olwig | C02F 1/441 |
| | | | 203/10 |
| 2013/0168224 A1* | 7/2013 | Godshall | C02F 1/14 |
| | | | 203/10 |
| 2015/0143806 A1* | 5/2015 | Friesth | F03G 7/04 |
| | | | 60/517 |
| 2015/0353379 A1* | 12/2015 | Lee | B01D 3/007 |
| | | | 203/10 |
| 2017/0275182 A1* | 9/2017 | Alshahrani | F03G 6/067 |
| 2018/0079658 A1* | 3/2018 | Gershon | B01D 61/025 |

FOREIGN PATENT DOCUMENTS

| | | |
|---|---|---|
| EP | 2784028 | 10/2014 |
| FR | 2968297 A1 | 6/2012 |
| KR | 20110015305 A | 2/2011 |
| KR | 20130080601 A | 7/2013 |

OTHER PUBLICATIONS

International (PCT) Preliminary Report on Patentability for PCT/EP2019/052790 dated Aug. 11, 2020, 9 pages.

* cited by examiner

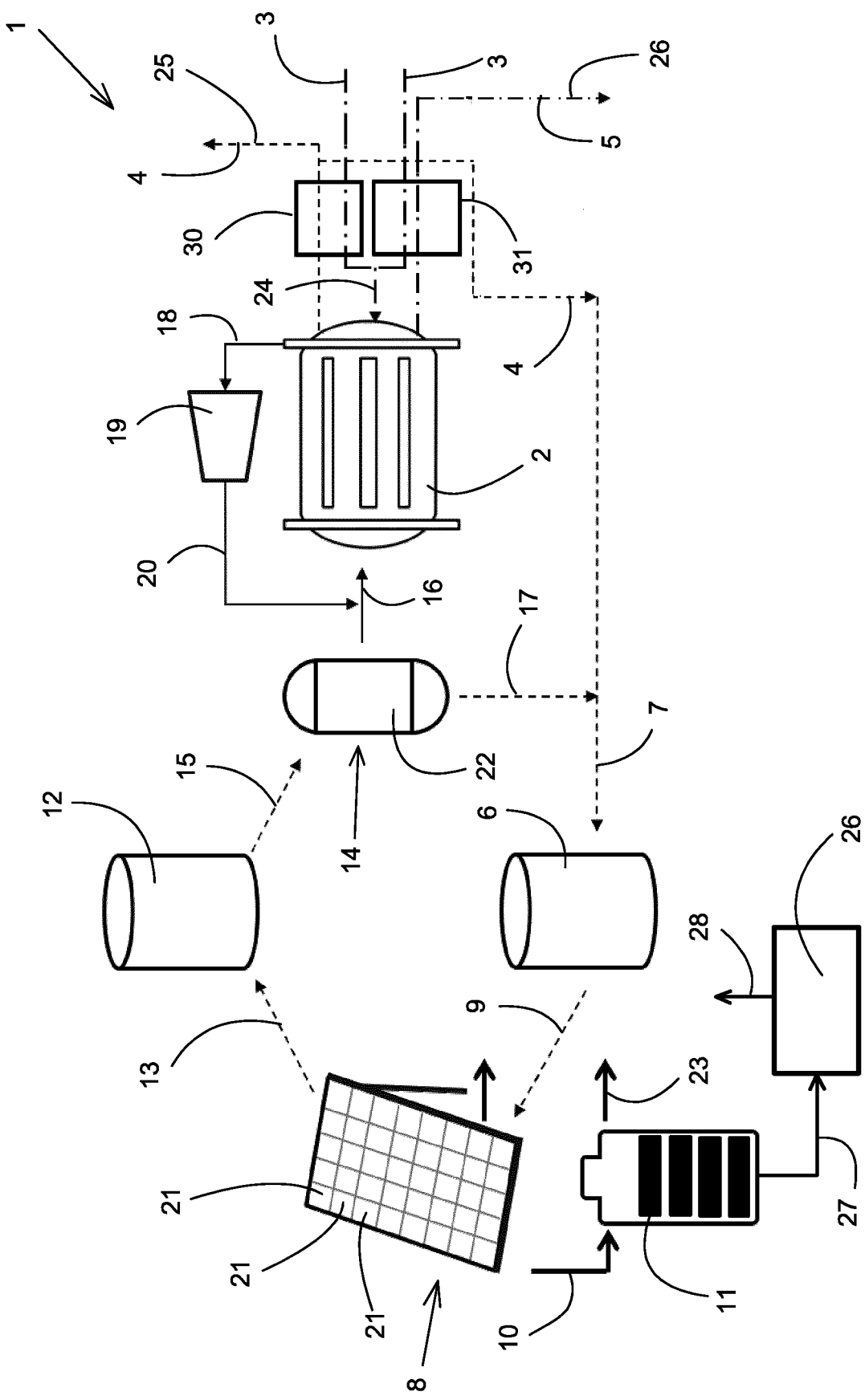

METHOD FOR OBTAINING DISTILLATE FROM NON-POTABLE WATER AS WELL AS A DEVICE FOR OBTAINING DISTILLATE FROM NON-POTABLE WATER

CROSS-REFERENCE TO RELATED APPLICATIONS

This application is a U.S. national stage entry of PCT Application No. PCT/EP2019/052790, filed Feb. 5, 2019, which claims the benefit of and priority to NL Patent Application No. 2020402, filed Feb. 8, 2018.

FIELD OF THE INVENTION

The invention relates to a method for obtaining distillate from non-potable water comprising the following steps:
utilizing solar power from a solar power system to produce electricity and heated water,
converting the heated water into steam,
utilizing at least the steam in a water treatment device to convert the non-potable water into distillate and concentrate,
transporting at least a part of the distillate to consumers for use.

The invention also relates to a device for obtaining distillate from non-potable water comprising:
a solar power system to produce electricity and steam from solar power,
a water treatment device to convert the non-potable water into distillate and concentrate utilizing at least the steam from the solar power system.

Distillate is water being potable. If desired it can be mineralised to obtain distillate. Concentrate is non-potable water being more concentrated than the non-potable water before entering the water treatment device.

BACKGROUND OF THE INVENTION

A method and plant, known from WO2017172736A1 uses a solar power system comprising a concentrated solar power (CSP) system, a photovoltaic (PV) system, a desalination system and a pump station. The CSP system is operable to concentrate solar energy to increase temperature and pressure of a heat transfer fluid and operable to produce steam utilizing heat from the heat transfer fluid. The PV system is operable to collect solar energy to produce electricity. The desalination system is operable to produce desalinated water from a salt water source utilizing the steam from the CSP system and electricity from the PV system. The pump station is operable to transmit the desalinated water to consumers for use.

The heat transfer fluid is for example thermal oil or direct molten salt.

The product water (desalinated water) is being stored in tanks for night use for consumers while the plant is shut down.

This means that amongst others the capacity of the desalination system must be sufficiently large to be able to produce an amount of desalinated water during periods of solar activity, being large enough to cover the need of desalinated water during daylight as well as to store desalinated water needed during periods of substantially no solar activity, like the night.

Another disadvantage is that each morning at sunrise, at the start of the solar activity on a day, the device needs to be started up again and that at sun set, at the end of the solar activity on the same day, the device needs to be shut down again. The pre-heating cycle in the morning leads to loss of conversion energy.

Furthermore, due to the salt water in the plant scaling and fouling will occur in the concentrated solar power (CSP) system and the photovoltaic (PV) system.

SUMMARY OF THE INVENTION

At least one of the objects of the invention is to provide a method which can be used during periods with and without solar activity so that in each period distillate can be obtained from non-potable water.

Another object of the invention is to provide a method whereby scaling and fouling of the solar power system is prevented.

This object is accomplished with the method according to the invention by:
transporting a part of the distillate generated in the water treatment device to a first distillate storage tank,
transporting distillate generated in the water treatment device from the first distillate storage tank to the solar power system,
the solar power system comprises photovoltaic panels to generate electricity from solar power, whereby solar thermal energy is being used to heat the distillate being transported from the first distillate storage tank along the heated photovoltaic panels, whilst the photovoltaic panels are being cooled through heat transfer from the photovoltaic panels to the distillate,
transporting the heated distillate generated in the water treatment device from the solar power system to a second distillate storage tank,
transporting the heated distillate generated in the water treatment device from the second distillate storage tank to a steam generator for generating steam,
utilizing the steam in the water treatment device to convert the non-potable water into distillate and concentrate.

By using the first distillate storage tank it can be guaranteed that during periods with solar activity there will always be enough distillate to be supplied to the solar power system for heating the distillate.

By using the second distillate storage tank it can be guaranteed that during periods with or without solar activity there will always be enough heated water to be supplied to the steam generator for converting the heated distillate into steam. So also during periods without solar activity steam can be transported to and used in the water treatment device to convert the non-potable water into distillate and concentrate.

The non-potable water can be seawater and the concentrate can be brine although the method is also suitable for treating other sources of polluted water.

The electricity generated by the solar power system can be used for electrical components required to execute this method.

Effectively, the photovoltaic panels are being cooled through heat transfer from the photovoltaic panels to the distillate.

In this manner the photovoltaic panels are being used to generate electricity as well as to heat the distillate. Due to the cooling, the productivity of the photovoltaic panels to generate electricity is enhanced.

Since the distillate is flowing through the solar power system, no or nearly no scaling or fouling will occur.

A disadvantage of the method according to WO2017172736A1 is that a heat transferring fluid like oil is needed. No such additional heat transfer fluid is needed by the method according to the invention.

It has to be noticed that KR1020130080601A discloses a method wherein the distillate is provided with chemicals in a post-treatment apparatus. The chemicals used include sodium hydroxide (NaOH), sodium bicarbonate ($NaHCO_3$), soda ash ($Na_2CO_3$), Lime (CaO), calcium hydroxide ($Ca(OH)_2$) and the like. The distillate comprising the chemicals is used in the solar hot water system. A disadvantage of such method is that the chemicals will cause scaling or fouling. Furthermore the device of KR1020130080601A needs a turbine with high temperature organic working fluid. By the method according to the present invention no such turbine is needed and in the whole system only water is being used. Another disadvantage of the device of KR1020130080601A is that it uses a solar hot water system as well as a solar power generation system, which takes at least twice the space as the integrated PV-T system as used in the present invention.

An embodiment of the method according to the invention is characterized in that during periods of solar activity the second distillate storage tank is being filled so that also in periods of substantially no solar activity heated distillate is available to be transported from the second distillate storage tank to the steam generator.

The capacity of the second distillate storage tank must be large enough that in the period of substantially lack of solar activity from about sunset till about sunrise the second distillate storage tank will not become empty whilst heated water is be transported from the second distillate storage tank to the steam generator and no heated water is provided by the solar power system to the second distillate storage tank.

Another embodiment of the method according to the invention is characterized in that the steam generator comprises a flash tank wherein the heated distillate is at least partly converted into steam. This is a very efficient and simple process for obtaining steam.

In the flash tank flash evaporation of the heated water occurs whereby steam is generated. Flash evaporation is the partial vapour (steam) that occurs when a saturated liquid stream undergoes a reduction in pressure by passing through a throttling valve or other throttling device.

Although the use of a flash tank as steam generator is preferred because of the availability of heated distillate derived from the solar power system, other devices like a boiler can also be used as steam generator as well.

Another embodiment of the method according to the invention is characterized in that distillate not being converted in the flash tank into steam is transported to the first distillate storage tank.

In this manner hot distillate not being converted into steam can easily be removed from the flash tank so that no distillate gets lost. Furthermore, the distillate leaving the flash tank is still for example at 70 degrees Celsius and comprises a lot of thermal energy content. This thermal energy will be maintained by transporting the hot distillate to the first distillate storage tank.

Another embodiment of the method according to the invention is characterized in that the water treatment device uses multiple-effect distillation (MED) technology.

With the well-known multiple-effect distillation (MED) technology non-potable for example salt water like seawater can easily be converted into distillate and concentrate like brine. Pumps used by the MED technology can be provided with electricity generated by the solar power system comprising for example photovoltaic panels.

Although MED technology is preferred because of relatively low operating temperatures, other technologies using steam like for example multiple stage flashing (MSF) and vapour-compression (VC) can also be used.

Another embodiment of the method according to the invention is characterized in that steam leaving an outlet of the water treatment device is compressed by a compressor, where after the compressed steam is transported back into an inlet of the water treatment device.

By means of the compressor the steam leaving the water treatment device, like a MED device is being compressed and raised in temperature to a temperature and pressure being similar as of the steam from the steam generator. In this manner a relatively small amount of energy is needed to be able to re-use the steam leaving the water treatment device. This effect is called vapour-compression (VC).

The total water treatment device can be called a MED-VC device.

Another embodiment of the method according to the invention is characterized in that the electricity is at least partly stored in a battery so that also in periods of substantially no solar activity electricity is available.

The capacity of the solar power system must be such that the amount of electricity generated in periods with solar activity is enough for both the periods with and without solar activity.

Another embodiment of the method according to the invention is characterized in that the electricity is being used for operating valves, pumps and/or electric components positioned between the water treatment device and the first distillate storage tank, the first distillate storage tank and the solar power system, the solar power system and the second distillate storage tank, the second distillate storage tank and the steam generator and/or the steam generator and the water treatment device.

By operating all valves, pumps and/or other kind of electric components with electricity generated preferably completely by the solar power system, the method can easily be used off grid, meaning without connection to an external electrical grid.

Another embodiment of the method according to the invention is characterized in that the steps are being controlled by means of a controller preferably operable by electricity produced by the solar power system.

In this manner the method can be easily controlled. In case that a sensor is added being able to detect when the period without sufficient solar activity starts, for example by measuring the amount of electricity generated by the solar power system or using a light sensor, the method can be used without human intervention.

Another embodiment of the method according to the invention is characterized in that the method is being used whilst being off grid.

Due to the distillate storage tanks and the battery, the method can be used without a connection to an external electrical grid and without using any fossil fuel. It can be used in rural areas without being dependent on such an external electrical grid or on burning fossil fuel resources.

The invention also relates to a device for obtaining distillate from non-potable water comprising:
  a solar power system to produce electricity and steam from solar power,
  a steam generator for converting the heated water into steam, a water treatment device to convert the non-potable water into distillate and concentrate utilizing at least the steam from the steam generator, The device according to the invention is characterized by, a first distillate storage tank for storing a part of the distillate being generated in the water treatment device, which first distillate storage tank is in fluid connection with the water treatment device and with the solar power system, the solar power system comprises photovoltaic panels to generate electricity from solar power and means to guide distillate along the photovoltaic panels, a second distillate storage tank for storing distillate being generated in the water treatment device and being heated in the solar power system, which second distillate storage tank is in fluid connection with the solar power system, a steam generator for generating steam, which steam generator is in fluid connection with the second distillate storage tank and the water treatment device.

The first distillate storage tank is used to be able to guarantee that during periods with solar activity there will always be enough distillate to be supplied to the solar power system for heating the distillate.

The second distillate storage tank is used to be able to guarantee that during periods with or without solar activity there will always be enough heated water to be supplied to the steam generator for converting the heated distillate into steam.

The device can be used off grid, if desired or necessary.

By guiding the distillate along the photovoltaic panels, the photovoltaic panels will be cooled, thereby increasing the electrical output of the photovoltaic panels. In this manner the photovoltaic panels are being used for generating electricity as well as for heating the distillate from the first distillate storage tank.

BRIEF DESCRIPTION OF THE DRAWINGS

The method and device according to the invention will further be explained with reference to the drawings, wherein, FIG. 1 is a schematic view of the device according to the invention.

DESCRIPTION OF PREFERRED EMBODIMENTS

FIG. 1 shows a device 1 for obtaining distillate from non-potable water according to the invention. The device 1 comprises a water treatment device 2 to convert the non-potable water 3 into distillate 4 and concentrate 5;

a first distillate storage tank 6 for storing a part of the distillate 4, which first distillate storage tank 6 is in fluid connection 7 with the water treatment device 2;

a solar power system 8 to produce electricity and steam from solar power, which solar power system 8 is in fluid connection 9 with the first distillate storage tank 6 and in electrical connection 10 with a battery 11;

a second distillate storage tank 12 for storing distillate being heated in the solar power system 8, which second distillate storage tank 12 is in fluid connection 13 with the solar power system 8;

a steam generator 14 for generating steam, which steam generator 14 is in fluid connection 15 with the second distillate storage tank 12, in fluid connection 16 with the water treatment device 2 and in fluid connection 17 with the first distillate storage tank 6.

An outlet of the water treatment device 2 is in fluid connection 18 with an inlet of a compressor 19 to compress the steam leaving the water treatment device 2 and to transport the compressed steam via fluid connection 20 and the fluid connection 16 back into the water treatment device 2. This highly improves the efficiency of the device 1.

The solar power system 8 comprises photovoltaic panels 21 to generate electricity from solar power. The solar power system 8 also comprises means to guide distillate along the photovoltaic panels 21 so that the distillate will be heated by the photovoltaic panels 21, being hot due to the solar power. To guide water along photovoltaic panels so that the water will be heated by the photovoltaic panels is known from amongst others WO2014053308 of the same inventor as this application.

The steam generator 14 comprises a flash tank 22 to convert heated distillate from the second distillate storage tank 12 into steam. It will be clear that the second distillate storage tank 12 might be insulated to prevent loss of temperature of the distillate in the second distillate storage tank 12.

The water treatment device 2 is a multiple-effect distillation (MED) device. Such MED device is commonly known and will therefore not further be explained.

The battery 11 is being used for storing electricity generated by the solar power system 11 and providing electricity via connection 23 to all electrical components of the device 1, like the compressor 19 and/or valves, pumps and/or other electric components (not shown in FIG. 1) in the fluid connection 7 between the water treatment device 2 and the first distillate storage tank 6, the fluid connection 9 between the first distillate storage tank 6 and the solar power system 8, the fluid connection 13 between the solar power system 8 and the second distillate storage tank 13, the fluid connection 15 between the second distillate storage tank 12 and the steam generator 14, the fluid connection 16 between the steam generator 14 and the water treatment device 2, the fluid connection 18 between the water treatment device 2 and the compressor 19, and/or the fluid connection 20 between the compressor 19 and the fluid connection 16.

Additional valves and/or pumps and/or other electric components like sensors operated by electrical energy (not shown) may be present and electrically connected to the battery 11 in a pipe 24 for transporting the non-potable water 3 like salt water to the water treatment device 2, a pipe 25 for transporting the distillate 4 from the water treatment device 2 to consumers and a pipe 26 for transporting the concentrate 5 like brine away from the water treatment device 2.

The device 1 can also be provided with sensors for checking the status of the components the device 1. Also these sensors can be electrically connected to the battery 11.

To easily control the several components of device 1, the device 1 comprises a controller 27 being electrically connected via line 28 to the battery 11 as well as electrically connected via line 29 to all components to be controlled like the valves, pumps and/or electric components like sensors, the water treatment device 2, the first distillate storage tank 6, the solar power system 8, the second distillate storage tank 12, the steam generator 22 and the compressor 19.

By means of the controller 27, the second tank 12 is being filled during periods of solar activity so that also in periods of substantially no solar activity heated water is available to be transported from the second distillate storage tank 12 to the steam generator 14.

To reuse as much energy as possible from the several flows of non-potable water 3, distillate 4 and concentrate 5 for further use in the device 1, a condenser 30 and a heat exchanger 31 are provided. In the condenser 30 steam from the non-potable water and generated in the water treatment device 2 is being cooled down and to become liquefied distillate 4, whilst a first part of the non-potable water 3 is being heated by the steam. In the heat exchanger 31, heat exchange occurs between the relatively hot condensate 5 and to second part of the relatively cold non-potable water 3 like seawater. The first part and second part of the non-potable water 3 are combined in a pipe 24 to be transported to the water treatment device 2.

The device 1 works according to the method of the invention as follows:

After starting up the device 1, non-potable water 3 like seawater is transported through pipe 24 into the MED device 2, where the non-potable water 3 is converted into distillate 4 and concentrate 5 like brine. The concentrate 5 is transported through pipe 26 away from the MED device 2, for example back to the sea. For environmental consideration it is preferred that the brine is less than 1.4 times more concentrated than the seawater. Preferably the brine is mixed with seawater to reduce its temperature.

The main part of the distillate 4 is transported through pipe 25 to consumers to be used as potable water or for other purposes.

A part of the distillate 4 is transported through fluid connection 7 to the first distillate storage tank 6. In the first distillate storage tank 6 the distillate 4 has a temperature of for example 60 degrees Celsius. The amount of this part of distillate is about the same as the amount of distillate turned into steam in the flash tank 22.

From the first distillate storage tank 6 the distillate is transported through fluid connection 9 to solar power system 8. In the solar power system 8 electricity is generated which is stored in battery 11. Furthermore, in the solar power system 8 the distillate coming from the first distillate storage tank 6 is being heated from for example 60 Celsius to 95 Celsius or more.

The heated distillate is transported through fluid connection 13 to the second distillate storage tank 12. From the second distillate storage tank 12 the heated distillate is transported through fluid connection 15 to the steam generator 14.

During daytime in periods of solar activity, the amount of distillate coming from the solar power system 8 is more than needed for the steam generator 14 so that the amount of heated distillate in the second distillate storage tank 12 will increase.

During nighttime in periods of no solar activity, no distillate will come from the solar power system 8. However, due to the stored amount of heated distillate in the second distillate storage tank 12, it is still possible to transport heated water from the second distillate storage tank 12 to the steam generator 14. Since no heated distillate enters the second distillate storage tank 12 in nighttime, the amount of heated distillate in the second distillate storage tank 12 will slowly decrease.

In the steam generator 14, for example in the flash tank 22, steam is generated at temperatures ranging from 60 till 80 degrees Celsius under the corresponding pressure. The steam is transported through fluid connection 16 to the MED device 2, where it is being used for dividing the non-potable water 3 during multiple stages into steam to be cooled down to distillate 4 and concentrate 5 like brine. The steam can have a temperature of about 50-60 degrees Celsius at a corresponding pressure. During the transport of the steam through the MED device 2 the temperature of the steam slightly drops.

Liquid distillate remaining in the flash tank 22 is transported through fluid connection 17 back to the first distillate storage tank 6. The liquid distillate leaving the flash tank 22 can have a temperature of about 70 degrees Celsius. It is also possible to use other solar power systems, for example with separate units for generating electricity and for heating the distillate from the first distillate storage tank.

In an embodiment of the device according to the invention a 4 stage multiple-effect distillation (MED) device 2 has been used, whereby the water temperature in the flash tank 22 was about 95 degrees Celsius, the steam in fluid connection 16 was 70-80 degrees Celsius and the steam in fluid connection 18 was 50-60 degrees Celsius. The whole multiple-effect distillation (MED) device 2 works under sub-atmospheric pressure. More or less than four stages can be used.

Depending on the size of the device, an amount up to 2500 cubic meter of distillate can be produced every 24 hours. For each cubic meter an amount of about 8.5 kWh is required and generated by the solar power system 8.

For a device generating 10 cubic meter of distillate, the distillate storage tanks 6, 12 can have a capacity of 5 cubic meters. The solar array surface of photovoltaic panels will need to be about 150 square meters, for such a device.

Since distillate flows through the first distillate storage tank 6, the solar power system 8, the second distillate storage tank 12, the flash tank 22, the compressor 19 and the fluid connections between them no or nearly no scaling or fouling will occur in these components. Also in the part of the water treatment device water treatment device through which the steam flows no or nearly no scaling or fouling will occur.

It is also possible to place the condenser 30 and heat exchanger 31 in line whereby the non-potable water, like seawater first passes the condenser 30 or heat exchanger 31 and then the other one of the condenser 30 and heat exchanger 31

It is possible that the solar power system comprises separated devices to generate electricity and heated water, whereby each device operates on solar power. Due to the co-harvesting of both electricity and heated water based on solar power a higher overall efficiency is achieved.

It is also possible that distillate not being converted in the flash tank into steam is transported to for example the second effect of the multiple-effect distillation (MED) device.

If desired it is possible to add thermal collectors to generate hot water and/or photovoltaic panels to generate electricity in addition to the integrated PV-T panels 21 to obtain a desired balance between the amount of electricity needed and the amount of hot distillate needed.

If desired it is possible to add a heating element or heat storage device inside the first and/or second distillate storage tank to buffer excess solar electrical energy from the solar power system in the form of thermal energy.

If desired, a part of the distillate generated in the water treatment device can also be directly transported to the water treatment device, for example to a second effect of the MED-device, whilst another part of the distillate generated in the water treatment device is being transported to the first distillate storage tank.

LIST OF REFERENCE SIGNS 1 device
2 water treatment device 3 non-potable water
4 distillate
5 concentrate
6 first distillate storage tank
7 fluid connection
8 solar power system
9 fluid connection
10 electrical connection
11 battery
12 second distillate storage tank
13 fluid connection
14 steam generator
15 fluid connection
16 fluid connection
17 fluid connection
18 fluid connection
19 compressor
20 fluid connection
21 photovoltaic panel
22 flash tank
23 connection
24 pipe
25 pipe
26 pipe
27 controller
28 line
29 line
30 condenser
31 heat exchanger

The invention claimed is:

1. A method for obtaining distillate from non-potable water comprising the following steps:
   utilizing solar power from a solar power system to produce electricity and heated water,
   converting the heated water into steam,
   utilizing at least the steam in a water treatment device to convert the non-potable water into distillate and concentrate,
   transporting a part of the distillate to consumers for use,
   transporting a second part of the distillate generated in the water treatment device to a first distillate storage tank,
   transporting the second part of the distillate generated in the water treatment device from the first distillate storage tank to the solar power system,
   the solar power system comprises photovoltaic panels to generate electricity from solar power, whereby solar thermal energy is being used to heat the second part of the distillate being transported from the first distillate storage tank along the heated photovoltaic panels, while the photovoltaic panels are being cooled through heat transfer from the photovoltaic panels to the second part of the distillate,
   transporting the heated second part of the distillate from the solar power system to a second distillate storage tank,
   transporting the heated second part of the distillate from the second distillate storage tank to a steam generator for generating steam,
   utilizing the steam in the water treatment device to convert further non-potable water into the distillate and the concentrate.

2. The method according to claim 1, wherein during periods of solar activity the second distillate storage tank is being filled so that also in periods of substantially no solar activity heated distillate is available to be transported from the second distillate storage tank to the steam generator.

3. The method according to claim 1, wherein the steam generator comprises a flash tank, wherein the heated second part of the distillate is at least partly converted into steam.

4. The method according to claim 3, wherein the heated second part of the distillate not converted in the flash tank into steam is transported to the first distillate storage tank.

5. The method according to claim 1, wherein the water treatment device comprises multiple-effect distillation (MED) technology.

6. The method according to claim 1, wherein steam leaving an outlet of the water treatment device is compressed by a compressor, wherein the compressed steam is transported back into an inlet of the water treatment device.

7. The method according to claim 1, wherein the electricity is at least partly stored in a battery so that else in periods of substantially no solar activity electricity is available.

8. The method according to claim 1, wherein the electricity operates valves, pumps and/or electric components positioned between the water treatment device and the first distillate storage tank, the first distillate storage tank and the solar power system, the solar power system and the second distillate storage tank, the second distillate storage tank and the steam generator, and/or the steam generator and the water treatment device.

9. The method according to claim 1, wherein the steps are controlled by a controller operable by electricity produced by the solar power system.

10. The method according to claim 1, wherein the method is used while off grid.

11. A device for obtaining distillate from non-potable water comprising:
   a solar power system to produce electricity and heated water from solar power,
   a steam generator for converting the heated water into steam,
   a water treatment device to convert the non-potable water into distillate and concentrate utilizing at least the steam from the steam generator,
   a first distillate storage tank for storing a part of the distillate being generated in the water treatment device, wherein the first distillate storage tank is in fluid connection with the water treatment device and with the solar power system,
   wherein the solar power system comprises photovoltaic panels to generate electricity from solar power and means to guide the part of the distillate along the photovoltaic panels,
   a second distillate storage tank for storing the part of the distillate generated in the water treatment device and heated in the solar power system, wherein the second distillate storage tank is in fluid connection with the solar power system,
   a steam generator for generating steam, wherein the steam generator is in fluid connection with the second distillate storage tank and the water treatment device.

12. The device according claim 11, wherein the steam generator comprises a flash tank to convert the heated second part of the distillate into steam.

13. The device according to claim 12, wherein the steam generator is in fluid connection with the first distillate storage tank.

14. The device according to claim 11, wherein the water treatment device is a multiple-effect distillation (MED) device.

15. The device according to claim 14, wherein the device comprises a compressor connected on one side to an outlet of the water treatment device and connected on another side to an inlet of the water treatment device.

16. The device according to claim 11, wherein the device comprises a battery for storing electricity generated by the solar power system.

17. The device according to claim 11, wherein the device comprises valves, pumps and/or electric components positioned between the water treatment device and the first distillate storage tank, the first distillate storage tank and the solar power system, the solar power system and the second distillate storage tank, the second distillate storage tank and the steam generator and/or the steam generator and the treatment device which valves, pumps and/or electric components being operated by electricity produced by the solar power system.

18. The device according claim 11, wherein the device comprises a controller to control the water treatment device, the first distillate storage tank, the solar power system, the second distillate storage tank and/or the steam generator.

19. The device according to claim 18, wherein the controller controls the filling of the second tank during periods of solar activity so that also in periods of substantially no solar activity heated water is available to be transported from the second distillate storage tank to the steam generator.

\* \* \* \* \*